United States Patent
Murukesan et al.

(10) Patent No.: US 11,618,075 B2
(45) Date of Patent: Apr. 4, 2023

(54) METHODS FOR THE COMBINED SINTERING AND SURFACE TREATMENT OF VARIABLE GEOMETRY TURBOCHARGER VANES

(71) Applicant: Garrett Transportation I Inc, Torrance, CA (US)

(72) Inventors: Palaniappa Murukesan, Bangalore (IN); Philippe Renaud, Sanchey (FR)

(73) Assignee: Garrett Transportation I Inc., Torrance, CA (US)

( * ) Notice: Subject to any disclaimer, the term of this patent is extended or adjusted under 35 U.S.C. 154(b) by 76 days.

(21) Appl. No.: 17/096,987

(22) Filed: Nov. 13, 2020

(65) Prior Publication Data
US 2022/0152702 A1    May 19, 2022

(51) Int. Cl.
*B22F 3/22* (2006.01)
*B22F 3/10* (2006.01)
*B22F 3/11* (2006.01)

(52) U.S. Cl.
CPC ............ *B22F 3/225* (2013.01); *B22F 3/1021* (2013.01); *B22F 3/11* (2013.01); *B22F 2301/35* (2013.01)

(58) Field of Classification Search
CPC ...... B22F 2301/35; B22F 3/11; B22F 3/1021; B22F 3/225; B22F 5/04; B22F 2998/10; B22F 2999/00; F05D 2220/40; F05D 2230/22; Y02T 10/12; C22C 33/0285; F01D 17/165; F02B 37/24; F02C 6/12
See application file for complete search history.

(56) References Cited

U.S. PATENT DOCUMENTS

| | | | |
|---|---|---|---|
| 8,383,203 B2 | 2/2013 | Belhadjhamida et al. | |
| 2002/0058136 A1* | 5/2002 | Belhadjhamida | B22F 3/225 264/572 |
| 2008/0237403 A1 | 10/2008 | Kelly et al. | |
| 2013/0266469 A1* | 10/2013 | Roth-Fagaraseanu | C22C 1/0491 419/30 |
| 2017/0145912 A1* | 5/2017 | Micanek | F01D 17/165 |
| 2017/0182559 A1* | 6/2017 | Jung | C22C 19/058 |
| 2018/0250738 A1* | 9/2018 | Nakamura | B22F 1/10 |
| 2020/0009653 A1* | 1/2020 | Tseng | B22F 1/10 |
| 2021/0026308 A1* | 1/2021 | Brinson | B23C 1/16 |

FOREIGN PATENT DOCUMENTS

| | | |
|---|---|---|
| CN | 108311701 A | 7/2018 |
| JP | 2009293417 A | 12/2009 |
| JP | 2009293418 A | 12/2009 |

OTHER PUBLICATIONS

Hardness Conversion Chart, 2008 (Year: 2008).*
North American Stainless, Grade-310S, Oct. 2010 (Year: 2010).*

\* cited by examiner

*Primary Examiner* — John A Hevey
(74) *Attorney, Agent, or Firm* — Quinn IP Law

(57) ABSTRACT

A method for fabricating a vane for a variable geometry turbocharger (VGT) includes the steps of providing or obtaining a substrate metal in powdered form, mixing a binder with the powdered substrate metal to form a mixture, performing an injection molding process using the mixture to form a green substrate in the shape of the vane, debinding the green substrate to form a brown substrate in the shape of the vane having a porous structure, applying a surface treatment slurry to at least a portion of the brown substrate, and sintering the surface treated brown substrate to form the vane.

20 Claims, 5 Drawing Sheets

METHODS FOR THE COMBINED SINTERING AND SURFACE TREATMENT OF VARIABLE GEOMETRY TURBOCHARGER VANES

TECHNICAL FIELD

The present disclosure generally relates to methods for manufacturing components used in turbochargers. More particularly, the present disclosure relates to methods for manufacturing variable geometry turbocharger vanes that combines the steps of sintering and surface treatment.

BACKGROUND

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft and housed in a compressor housing. Thus, rotary action of the turbine also causes the air compressor to spin within a compressor housing of the turbocharger that is separate from the turbine housing. The spinning action of the air compressor causes intake air to enter the compressor housing and be pressurized or boosted a desired amount before it is mixed with fuel and combusted within the engine combustion chamber.

In a turbocharger it is often desirable to control the flow of exhaust gas to the turbine to improve the efficiency or operational range of the turbocharger. Variable geometry turbochargers (VGTs) have been configured to address this need. A type of such VGT is one having a variable exhaust nozzle, referred to as a variable nozzle turbocharger (VNT). Different configurations of variable nozzles have been employed to control the exhaust gas flow. One approach taken to achieve exhaust gas flow control in such VGTs involves the use of multiple pivoting vanes that are positioned annularly around the turbine inlet. The pivoting vanes are commonly controlled to alter the throat area of the passages between the vanes, thereby functioning to control the exhaust gas flow into the turbine.

Many VGT turbocharger vanes are made using stainless steels, and in particular HK30 stainless steel. HK 30 stainless steel is fully austenitic, and is alloyed primarily with chromium and nickel. HK 30 stainless steel is a highly cost effective material for vane application and provides the benefits of ease of manufacture due to good rivetability.

Due to their positioning around the turbine inlet, the pivoting vanes are subjected to very hot exhaust gasses, often in excess of 1000° C. These high temperature applications, however, pose a potential oxidation/wear risk on the HK 30 material. One possible alternative to this stainless steel would be to use nickel based superalloys. Due to process limitations of injection molding and riveting, however, there are only a few variants of Inconel nickel based superalloys that would be feasible. Yet, the alloys that are technically feasible are prone to excessively high cost, negatively impacting the business case. This situation creates a need for alternative cost-effective solutions for vanes based on HK 30 stainless steel.

One solution is to perform a surface treatment, using a material that has superior high temperature properties, on the HK 30 stainless steel to render it less susceptible to oxidation/wear. Such treatments often include aluminizing, stelliting (cobalt/chrome), or chromizing. Often times these surface treatments, which are diffusion based processes, require high temperatures for processing, thus making these treatments one of the greatest contributions to the overall cost of manufacturing the vanes.

Accordingly, it would be desirable to provide variable nozzle turbine vanes for turbocharger applications that can resist wear and oxidation during elevated temperature operations. More particular, it would be desirable to provide manufacturing methods for such vanes that include more efficient and cost effective steps for the surface treatment of the stainless steels used for the fabrication of these vanes. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Methods for the combined sintering and surface treatment of variable geometry turbocharger vanes are provided.

In an embodiment, by way of example only, a method for fabricating a vane for a variable geometry turbocharger (VGT) includes the steps of providing or obtaining a substrate metal in powdered form, mixing a binder with the powdered substrate metal to form a mixture, performing an injection molding process using the mixture to form a green substrate in the shape of the vane, debinding the green substrate to form a brown substrate in the shape of the vane having a porous structure, applying a surface treatment slurry to at least a portion of the brown substrate, and sintering the surface treated brown substrate to form the vane.

In another embodiment, by way of example only, a method for fabricating a vane for a variable geometry turbocharger (VGT) includes the step of providing or obtaining a substrate metal in powdered form. The substrate metal is an austenitic stainless steel. The method further includes the step of mixing a binder with the powdered substrate metal to form a mixture. The binder is selected from the group of: thermoplastic resins, waxes, and combinations thereof. The method further includes the steps of performing an injection molding process using the mixture to form a green substrate in the shape of the vane and debinding the green substrate to form a brown substrate in the shape of the vane having a porous structure. Debinding includes both solvent debinding and thermal debinding. The method further includes the step of applying a surface treatment slurry to at least a portion of the brown substrate. The surface treatment is selected from the group of: aluminide, chromide, and Stellie®, which is a trademark covering cobalt-chromium based alloys. The method further includes the steps of drying the surface treated brown substrate and sintering the dried, surface treated brown substrate to form the vane. Sintering is performed at a temperature of about 1000° C. to about 1400° C. for a time period of about 0.5 hours to about 12 hours. After sintering the surface treated brown substrate, the vane includes a soft core and an interdiffusion surface treated layer of 50 microns in thickness. Still further, the method includes the step of performing a finishing process on the vane.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The inventive subject matter will hereinafter be described in conjunction with the following drawing figures, wherein like numerals denote like elements, and wherein.

DETAILED DESCRIPTION

Figure 1:
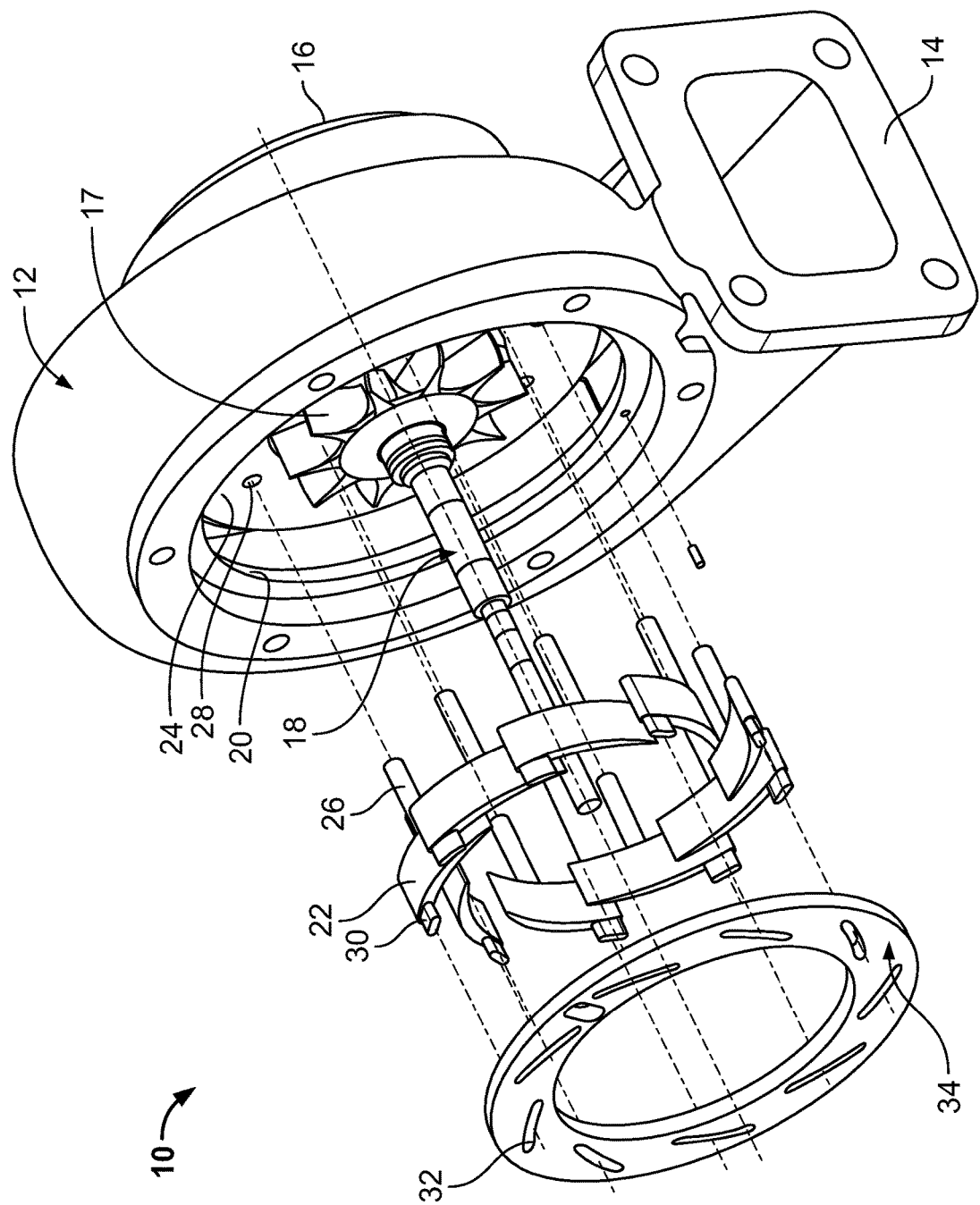
FIG. 1 is an exploded isometric view of a turbine housing for a variable geometry turbocharger employing moveable vanes.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Unless specifically stated or obvious from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, all numerical values provided herein are modified by the term "about."

The present disclosure is generally directed to methods for manufacturing VNT vanes using injection molding. In accordance with the embodiments described herein, the typical sintering process that is used to densify the injection molded vanes is also used to set a surface treatment of another metal or alloy, such as aluminide, chromide, or Stellie®. The surface treatment, which is a diffusion based process, is achieved by applying a surface treatment slurry to the vanes subsequent to injection molding but prior to sintering, when the component has a natural porosity and is not fully densified. By surface treating in this manner, a subsequent heating step (after sintering) to cause interdiffusion of the surface treatment at the surface of the vane is avoided, thus significantly reducing the manufacturing cost. As such, the present disclosure described manufacturing methods wherein sintering and surface treatment are combined in a single heating step. The resulting surface treated vane yields an improvement of the oxidation resistance and wear resistance. The wear resistance improvement on the vane shaft will be beneficial when moving (rotating) in the vane bore with controlled clearance. The oxidation resistance will be beneficial for the vane airfoil due to the high temperature exhaust gas flow.

A variable geometry turbine (VGT) generally includes a center housing having a turbine housing attached at one end, and a compressor housing attached at an opposite end. A shaft is rotatably disposed within a bearing assembly contained within the center housing. A turbine or turbine wheel is attached to one shaft end and is disposed within the turbine housing, and a compressor impeller is attached to an opposite shaft end and is disposed within the compressor housing. The turbine and compressor housings are attached to the center housing by bolts that extend between the adjacent housings.

FIG. 1 illustrates a portion of a VGT 10 including a turbine housing 12 having a standard inlet 14 for receiving an exhaust gas stream, and an outlet 16 for directing exhaust gas to the exhaust system of the engine. A volute is connected to the exhaust inlet and an integral outer nozzle wall is incorporated in the turbine housing casting adjacent the volute. A turbine wheel 17 and shaft assembly 18 is carried within the turbine housing 12. Exhaust gas, or other high energy gas supplying the turbocharger, enters the turbine housing 12 through the inlet 14 and is distributed through the volute in the turbine housing 12 for substantially radial delivery to the turbine wheel through a circumferential nozzle entry 20.

Multiple vanes 22 are mounted to a nozzle wall 24 machined into the turbine housing 12 using shafts 26 that project perpendicularly outwardly from the vanes. The vanes 22 used in such a VGTs are generally slim and in an airfoil configuration. The shafts 26 are rotationally engaged within respective openings 28 in the nozzle wall. The vanes 22 each include actuation tabs 30 that project from a side opposite the shafts and that are engaged by respective slots 32 in a unison ring 34, which acts as a second nozzle wall.

An actuator assembly (not shown) is connected with the unison ring 34 and is configured to rotate the ring in one directed or the other as necessary to move the vanes radially outwardly or inwardly to respectively increase or decrease the amount of exhaust gas flow to the turbine. As the unison ring is rotated, the vane tabs 30 are caused to move within their respective slot 32 from one slot end to an opposite slot end. Since the slots are oriented radially along the unison ring, the movement of the vane tabs 30 within the respective slots 32 causes the vanes to pivot via rotation of the vane shafts within their respective openings and move radially outwardly or inwardly depending on the unison ring rotational direction.

Figure 2:
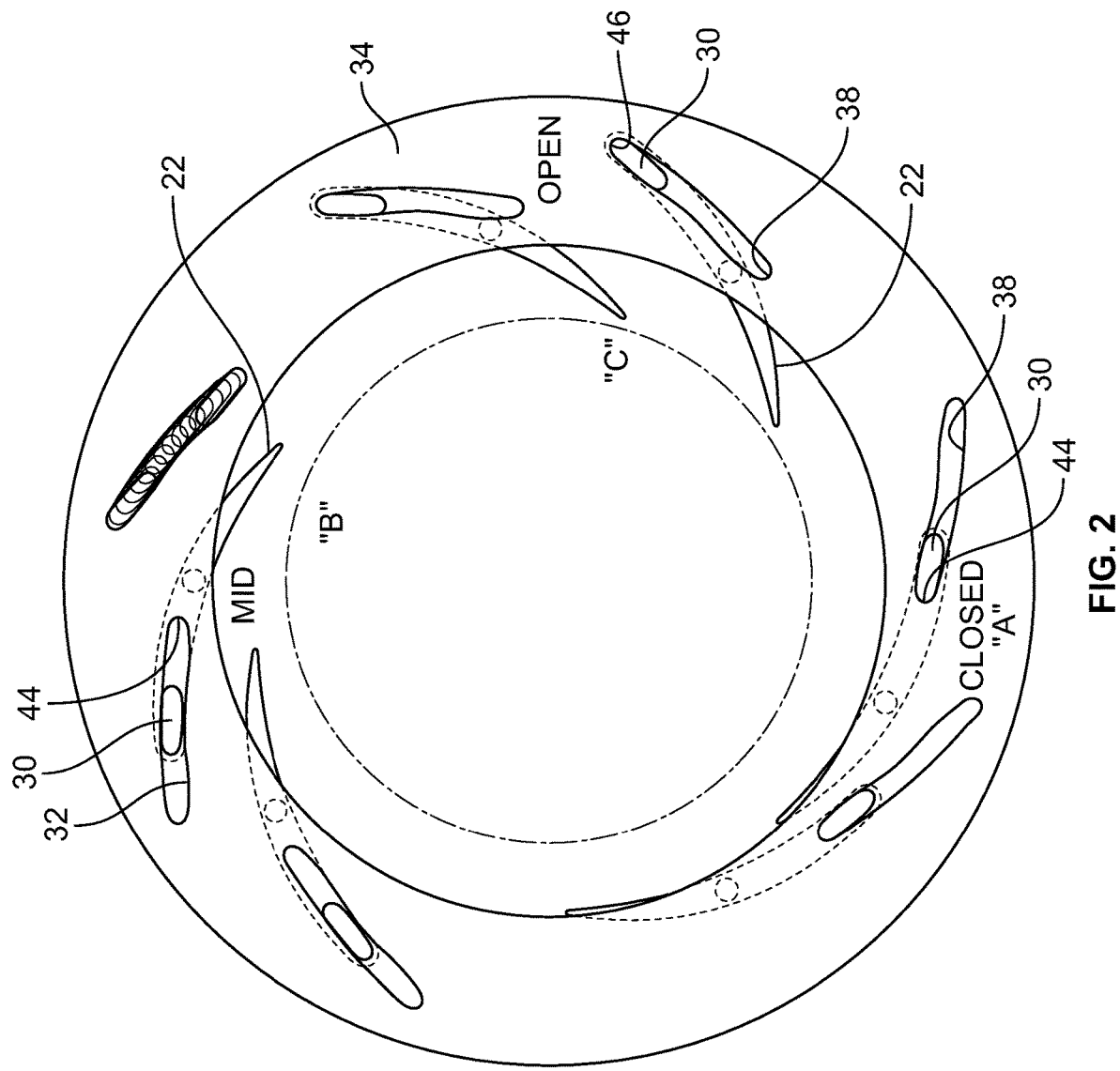
FIG. 2 is a top view of a unison ring of the turbocharger of FIG. 1 showing vanes in different vane operating positions.

FIG. 2 illustrates the general movement pattern of vanes 22, as used in the VGT 10 described and illustrated above in FIG. 1, when actuated by the unison ring. Each vane tab 30 is disposed within a respective slot 32 of a unison ring 34. In a closed position "A", the vane tab 30 is positioned adjacent a first end 44 of the slot 32. This position is referred to as a closed position because the vane is not flared radially outward, thereby serving to limit the flow of exhaust gas to the turbine. At an intermediate position "B", the unison ring 34 has been rotated a sufficient amount such that the vane tab 30 is moved within the slot 32 away from the first slot end 44 towards a middle position of the slot.

The vane tab 30 movement is provided by the pivoting action of the vane relative to the nozzle wall, allowing the vane 22 to be rotated radially outwardly a given extent. At position "B", the intermediate radial projection of the vane 22 serves to increase the flow of exhaust gas to the turbine when compared to closed position "A". At position "C", the unison ring 34 has now been rotated to a maximum position, causing the vane tab 30 to be moved within the slot 32 to a second end 46. Again, such further vane movement is facilitated by the pivoting arrangement between the vane 22 and the nozzle wall 24, allowing the vane 22 to be rotated radially outwardly to a maximum position. At position "C," the maximum radial projection of the vane 22 serves to increase the flow of exhaust gas to the turbine when compared to the intermediate position "A".

Figure 3:
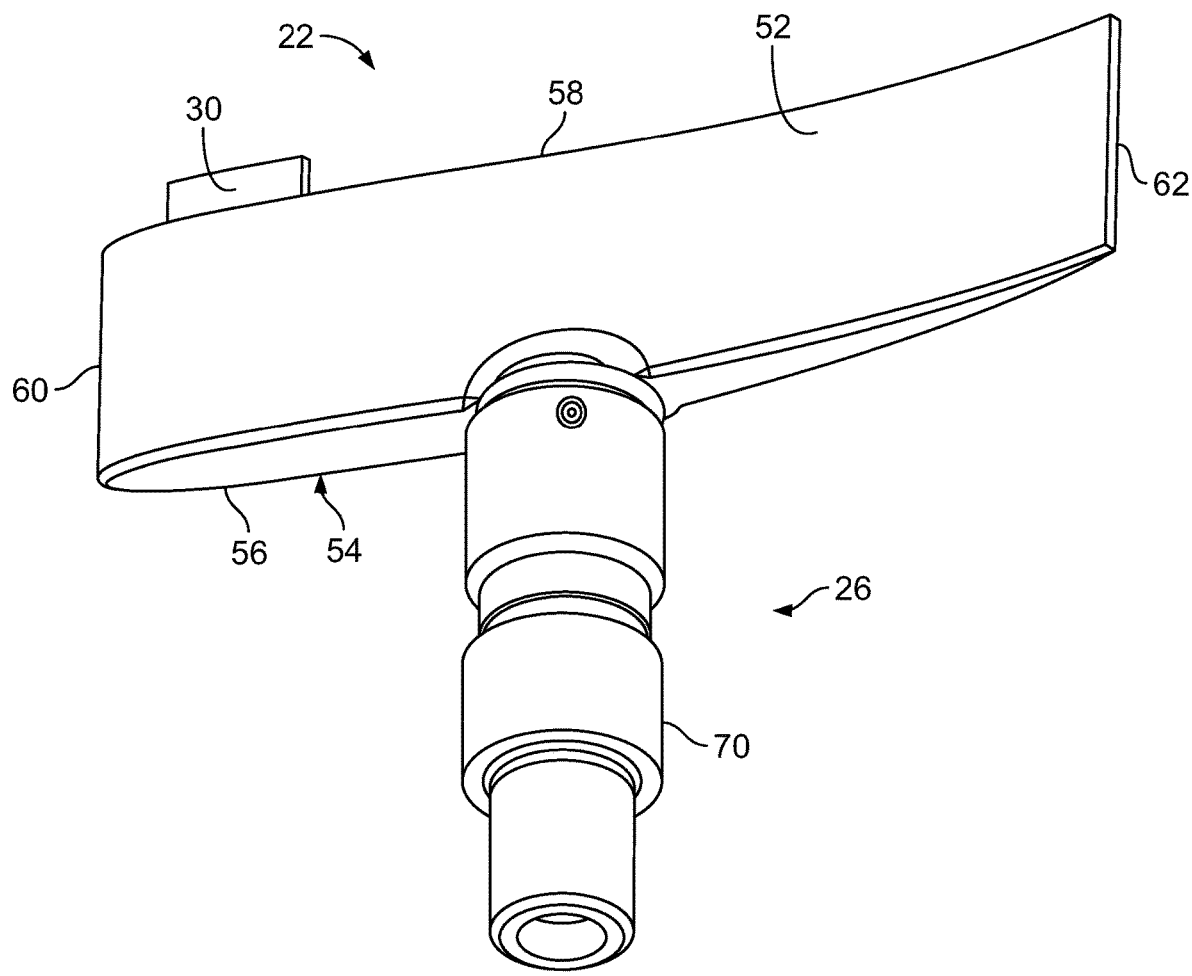
FIG. 3 is a detailed view of the vanes shown in FIG. 2.

FIG. 3 is an enlarged view of an exemplary vane 22 that includes an inner radial surface 52, an opposite outer radial surface 54, and axial surfaces 56 and 58. These vane surfaces are defined relative to the vane placement within the turbine housing 12. The vane 22 includes a leading edge or nose 60 and a trailing edge 62 at opposite common ends of the inner and outer radial surface 52 and 54. As used herein, the term leading edge is used to refer to a rounded nose portion of the vane 22, and is not intended to a sharp or abruptly angled surface feature. The vane 11 includes tab 30 projecting outwardly away from the axial surface 58 and positioned adjacent the leading edge 60, which tab 30 is configured to cooperate with the unison ring slot 32 in the manner described above to facilitate vane actuation. Shaft 26 includes an enlarged diameter section 70, which is sized and configured to provide a secure pressed fit attachment within the openings 28.

Vanes 22 may be manufactured using a metallic material that exhibits good strength, machinability, and high temperatures oxidation and wear resistance. In some embodiments, vanes 22 may be manufactured using a stainless steel material. Stainless steel is an iron based alloy that includes at least 11% chromium, along with one or more other alloying elements such as carbon, nitrogen, aluminum, silicon, sulfur, titanium, nickel, copper, selenium, niobium, and molybdenum, for example. Stainless steels may be austenitic, ferritic, or martensitic. In some embodiments, austenitic stainless steels may be employed for the manufacture of vanes 22, due to their high temperature properties and ease of machining. In one particular embodiment, HK 30 stainless steel may be employed. The composition of HK 30 is set forth in TABLE 1, below:

TABLE 1

Composition of HK 30 Stainless Steel

| | HK 30 | |
| --- | --- | --- |
| Elements | Min (%) | Max (%) |
| Carbon | 0.25 | 0.35 |
| Silicon | 0 | 1.75 |
| Chromium | 23 | 27 |
| Nickel | 19 | 22 |
| Molybdenum | 0 | 0.50 |
| Manganese | 0 | 1.5 |
| Phosphorous | 0 | 0.04 |
| Sulphur | 0 | 0.04 |
| Iron | | Rest |

Figure 4:
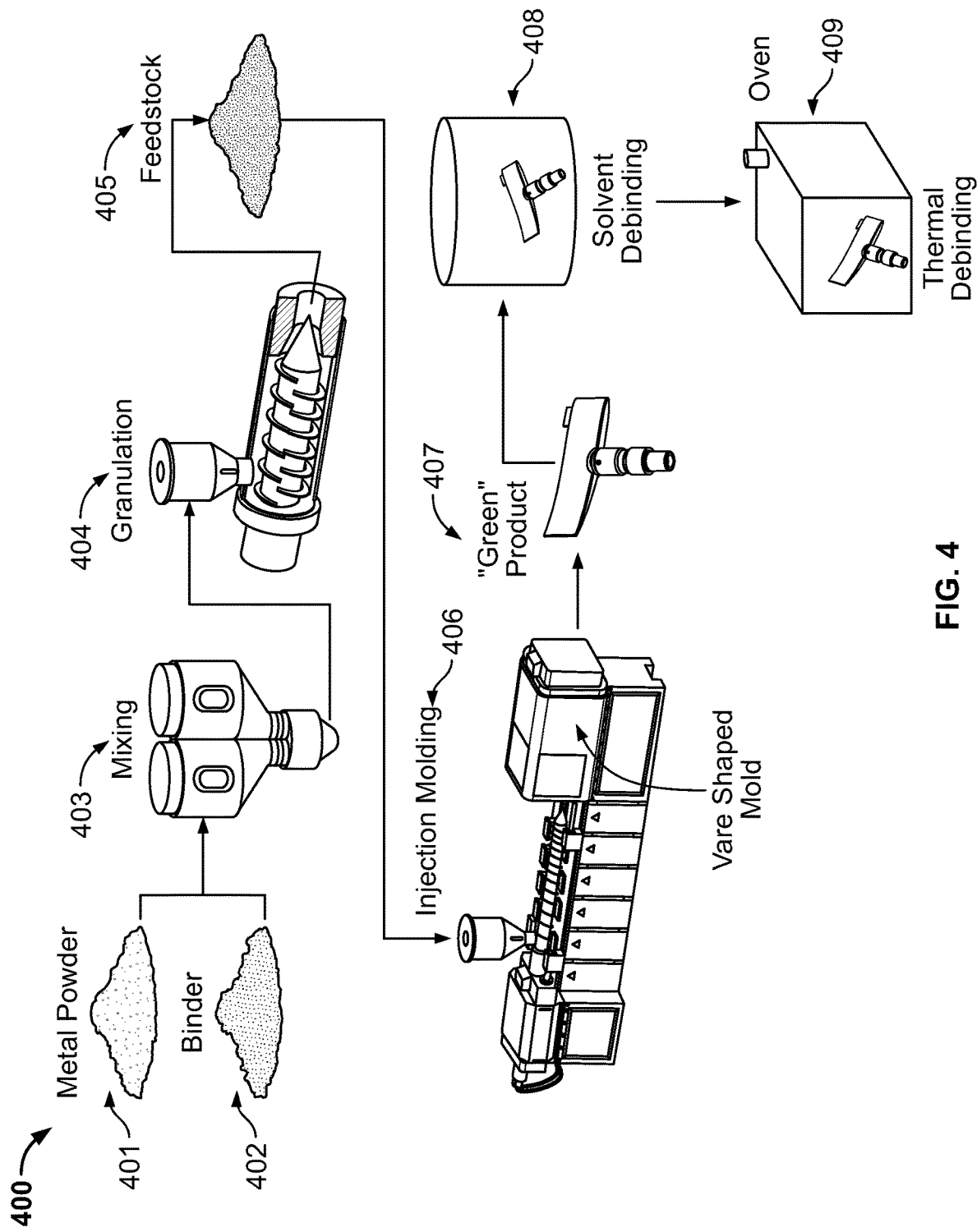
FIG. 4. is a process flow diagram illustrating certain steps in the injection molding process, including feedstock preparation, injection molding, and solvent debinding.

Using a suitable metallic material in powder form, such as HK 30 stainless steel, the vane manufacturing process may begin with a step of metal injection molding. In metal injection molding technology, there are four processing stages which are, mixing of powders and binders to produce feedstock, injection molding, debinding, and sintering. Turning now to FIG. 4, which illustrates a process 400 for the initial steps of injection molding, with regard to the first step of producing the feedstock, the raw materials for metal injection molding are the metal powder (401) and a thermoplastic binder (402). The feedstock may be prepared by mixing (403) the powdered metal with the binder and heating the blend to form a slurry. Uniform dispersion of the powdered metal in the slurry may be achieved by employing high shear mixing. The slurry may then be cooled to ambient temperature and then granulated (404) to provide the feedstock (405) for the metal injection molding.

The amount of powdered metal and binder in the feedstock may be selected to optimize moldability while insuring acceptable green densities. In one embodiment, the feedstock includes at least about 80 percent by weight powdered metal. In yet another embodiment, the feedstock includes at least about 85 percent by weight powdered metal. In yet another embodiment, the feedstock includes at least about 90 percent by weight powdered metal. The binding agent may be any suitable binding agent that does not destroy or interfere with the powdered metals, or any combination of two or more binding agents. In one embodiment, the binder is an organic-based binder. Examples of binders include, but are not limited to, thermoplastic resins, waxes, and combinations thereof. Non-limiting examples of thermoplastic resins include polyolefins such as acrylic polyethylene, polypropylene, polystyrene, polyvinyl chloride, polyethylene carbonate, polyethylene glycol, and mixtures thereof. Suitable waxes include, but are not limited to, microcrystalline wax, bee wax, synthetic wax, and combinations thereof.

Next with regard to the step of injection molding, the slurry is injected into a vane shaped mold cavity in an injection molding machine (406). As initially noted, because surface treatment of the vane will eventually be performed, the vane shaped mold cavity should be sized to account for this subsequent surface treatment when considering the required final dimensions for the vane. Injection molding may be performed at an elevated temperature, for example from about 100° C. to about 200° C., such as about 150° C. The result of the injection molding is a tensile vane shaped compact referred to as a "green" (407).

Next, with regard to the step of debinding, the green part may undergo initial debinding in a solvent debinding process (408). For solvent debinding, the binder composition should include a composition that is soluble in an organic solvent at low temperatures, such that a network of interconnected porosity is formed in the green part when the green part is placed in the organic solvent. Exemplary organic solvents include acetone, trichloroethylene, and heptane. The green part may then undergo further debinding in a thermal debinding process (409). For thermal debinding, the green part is placed in an oven. The temperature of the oven may range from about 400° C. to about 600° C., for example from about 450° C. to about 550° C. The temperature may be varied within this range during thermal debinding. Thermal debinding may be performed in the oven for a total time of about 30 minutes to about 4 hours, for example about 45 minutes to about 3 hours. Drying of the part also occurs during this time in the oven. Once the binder is removed through the combination of solvent debinding and thermal debinding, what remains is a somewhat porous vane shaped component known as a "brown".

As initially noted above, the final processing stage for injection molding technology is sintering. Further as noted above, the present disclosure is directed to a process that that combines the steps of sintering and surface treatment. Surface treatment may be performed using a material that has superior high temperature properties, as compared to the substrate material (such as HK 30 stainless steel) to render it less susceptible to oxidation/wear. Such treatments may include aluminizing or chromizing. Stelliting may also be possible. The surface treatment process may include applying a surface treatment slurry to the "brown" part. Slurries typically include a donor metal powder, an activator powder, and a binder.

In one embodiment, the slurry is an aluminizing slurry, wherein the donor metal powder includes a metallic aluminum alloy having a melting temperature higher than aluminum. For example, the donor metal powder of the aluminizing slurry form of the slurry may include metallic aluminum alloyed with chromium, iron, another aluminum alloying agent, or a combination thereof, provided that the alloying agent does not deposit during the diffusion aluminizing process, but instead serves as an inert carrier for the aluminum of the donor material. The activator powder of the aluminizing slurry form of the slurry may include any suitable material, including, but not limited to, ammonium chloride, ammonium fluoride, ammonium bromide, another halide activator or combinations thereof. Suitable materials for the activator powder react with aluminum in the donor metal powder to form a volatile aluminum halide, such as, but not limited to, $AlCl_3$ or $AlF_3$, which reacts at the substrate to deposit aluminum. The binder may include an organic polymer gel. The organic polymer gel of the binder of the aluminizing slurry may include low molecular weight polyols such as polyvinyl alcohol. In one embodiment, the binder further includes a cure catalyst, an accelerant, or both, such as, but not limited to, sodium hypophosphite. The aluminizing slurry may include any suitable composition, including, but not limited to, a composition having, by weight, about 35% to about 65% of the donor metal powder, about 1% to about 50% of the activator powder, and about 25% to about 60% of the binder.

In one embodiment, the slurry is a chromizing slurry, wherein the donor metal powder includes chromium. The donor metal powder may include chromium in the form for chromium powder, and may further include an aluminum powder. In one embodiment, the chromium powder includes an additive such as aluminum, cobalt, nickel, silicon, or mixtures thereof. The activator powder of the chromizing slurry form of the slurry may be any suitable activator, including, but not limited to, ammonium halides, chromium halides, aluminum halides, and mixtures thereof. In one embodiment, the activator is $NH_4Cl$, $NH_4F$, $NH_4Br$, $CrCl_2$, $CrCl_3$, $AlCl_3$, or a combination thereof. The binder of the chromizing slurry form of the slurry may be any suitable binder which promotes cohesiveness of the chromizing slurry form of the slurry and which decomposes when exposed to a predetermined temperature. Furthermore, the chromizing slurry may include an inorganic salt having a melting point that is less than or equal to about 800° C. The chromizing slurry may include any suitable composition, including, but not limited to, a composition having, by weight, about 1% to about 60% of the donor metal powder, about 1% to about 70% of the inorganic salt, about 1% to about 30% of the activator powder, and at least about 1% of the binder.

Regardless of the form of slurry chosen, the slurry may be applied to some or all of the surface of the "brown" vane part. For example, in one embodiment, the shaft 26 of the vane may be masked, leaving just the airfoil surfaces (52, 54, 56, 58) to have the slurry applied. Alternatively, all surface of the vane may have the slurry applied. Due to the somewhat porous nature of the "brown" vane part, the slurry may penetrate into the vane to some extent, for example up to about 10, up to about 25 microns, or up to about 50 microns in some embodiments. This penetration allows the surface treatment to form an interdiffusion zone with the substrate upon sintering, thus avoiding subsequent (expensive) heat treating to cause interdiffusion if the slurry had instead been applied to the vane post-sintering. This may be performed such that the vane has a soft core and an interdiffusion surface treated layer of up to about 50 microns in thickness. The surface thickness of the slurry (above the substrate), may be at least about 10 microns, and may range up to about 30 microns, up to about 40 microns, or up to about 50 microns in some embodiments. Once the slurry has been applied as desired, the slurry is allowed to dry on the surface of the vane, for a time period that may range several hours or more.

Once the slurry has dried, as noted above, a step of sintering the surface treated vane component is performed as the last processing stage required to form the injection molded vane. Sintering is the process of compacting and forming a solid mass of material by heat and/or pressure without melting it to the point of liquefaction. In some embodiments, sintering includes heating the surface treated component within a range of about 1000° C. to about 1400° C., for example within a range of about 1100° C. to about 1300° C., depending of course on the choice of substrate metal. For example, in the embodiment of HK 30 stainless steel, sintering may be performed at a temperature of about 1270° C. to about 1300° C. Beneficially, during the sintering process, the surface treatment is also set, such that the surface treatment includes an interdiffusion region at the surface of the substrate along with a surface coating layer, both within the thickness ranges as previously described. Sintering may be performed for a time period including, but not limited to, a duration of from about 0.5 hours to about 12 hours, for example about 2 hours to about 8 hours, such as about 4 hours to about 8 hours. A fully densified, surface treated vane results from the sintering process.

Subsequent to sintering, one or more finishing steps may be performed, such as surface smoothing, machining to achieve final tolerances, riveting, and the like. The present disclosure should be understood to be inclusive of all conventional post fabrication machining, as known in the art. Thereafter, the vanes, fabricated in the foregoing manner, may be assembled, along with other necessary components, into a turbocharger.

Figure 5:
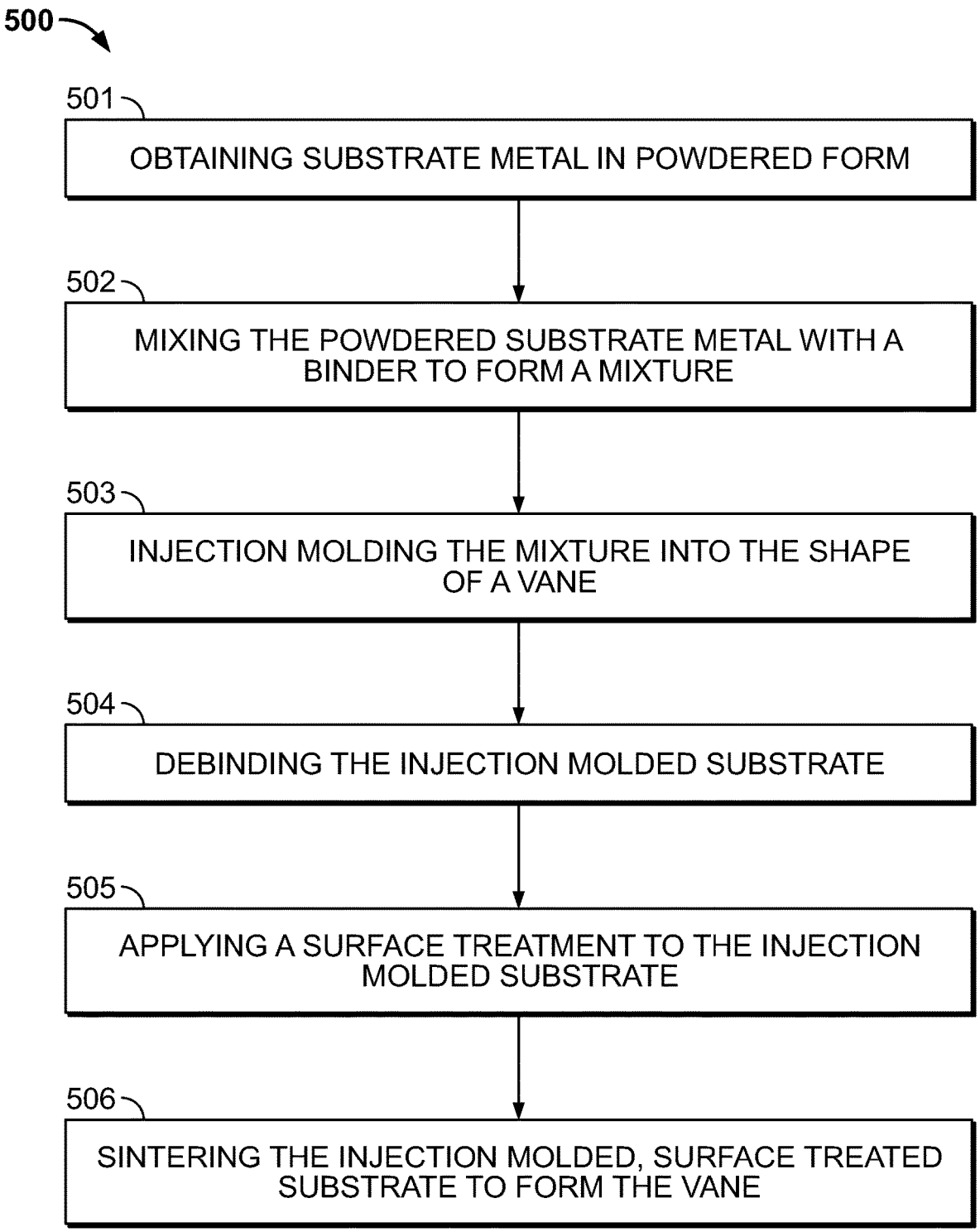
FIG. 5 is a process flowchart illustrating a method for manufacturing a VNT vane in accordance with an embodiment.

In view of the foregoing, FIG. 5 is a process flowchart illustrating an exemplary method 500 for fabricating a turbocharger VNT vane in accordance with an embodiment. Method 500 includes a step 501 of providing or obtaining a substrate metal in powdered form, a step 502 of mixing a binder with the powdered substrate metal to form a mixture, which is then followed by a step 503 of performing an injection molding process using the mixture to form a green substrate in the shape of the vane. The method 500 further includes a step 504 of debinding the green substrate to form a brown substrate in the shape of the vane having a porous structure, followed by a step 505 of applying a surface treatment slurry to at least a portion of the brown substrate. Still further, the method 500 includes a step 506 of sintering the surface treated brown substrate to form the vane.

Accordingly, the present disclosure has provided methods for manufacturing VNT vanes using injection molding. As described, the typical sintering process that is used to densify the injection molded vanes is also used to set a surface treatment of another metal or alloy, such as aluminide, chromide, or Stellie®. The surface treatment, which is a diffusion based process, is achieved by applying a surface treatment slurry to the vanes subsequent to injection molding but prior to sintering, when the component has a natural porosity and is not fully densified. By surface treating in this manner, a subsequent heating step (after sintering) to cause interdiffusion of the surface treatment at the surface of the vane is avoided, thus significantly reducing the manufacturing cost. As such, the present disclosure described manufacturing methods wherein sintering and surface treatment are combined in a single heating step. The resulting surface treated vane yields an improvement of the oxidation resistance and wear resistance.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A method for fabricating a vane for a variable geometry turbocharger (VGT), the method comprising the steps of:
   providing or obtaining a substrate metal in powdered form;
   mixing a binder with the powdered substrate metal to form a mixture;
   performing an injection molding process using the mixture to form a green substrate in the shape of the vane;
   debinding the green substrate to form a brown substrate in the shape of the vane having an outer surface and a porous structure that extends from the outer surface into the brown substrate;
   applying a surface treatment slurry to at least a portion of the brown substrate including onto the outer surface and into the porous structure including the surface treatment slurry penetrating into the brown substrate a depth of at least about 10 microns, wherein a surface thickness of the surface treatment slurry formed on the brown substrate is from about 10 to about 50 microns above the outer surface; and
   sintering the surface treated brown substrate to form the vane.

2. The method of claim 1, wherein the substrate metal is a stainless steel.

3. The method of claim 2, wherein the stainless steel is an austenitic stainless steel.

4. The method of claim 1, wherein the binder is selected from the group consisting of: thermoplastic resins, waxes, and/or combinations thereof.

5. The method of claim 1, wherein debinding comprises solvent debinding.

6. The method of claim 1, wherein debinding comprises thermal debinding.

7. The method of claim 1, wherein the surface treatment is selected from the group consisting of: aluminide, chromide, and a cobalt-chromium based alloy.

8. The method of claim 1, further comprising the step of masking an area of the surface of the brown substrate prior to applying the surface treatment slurry.

9. The method of claim 1, wherein the surface treatment is applied to an entirety of the brown substrate.

10. The method of claim 1, further comprising the step of drying the surface treated brown substrate prior to sintering the surface treated brown substrate.

11. The method of claim 1, wherein, after sintering the surface treated brown substrate, the vane comprises a soft core and an interdiffusion surface treated layer of 50 microns in thickness.

12. The method of claim 1, wherein sintering is performed at a temperature of about 1000° C. to about 1400° C. for a time period of about 0.5 hours to about 12 hours.

13. The method of claim 1, further comprising performing a finishing process on the vane.

14. The method of claim 13, wherein the finishing process is selected from surface smoothing, machining, riveting, and/or combinations thereof.

15. The method of claim 14, further comprising assembling a turbocharger using the vane.

16. A method for fabricating a vane for a variable geometry turbocharger (VGT), the method comprising the steps of:
   providing or obtaining a substrate metal in powdered form, wherein the substrate metal is a stainless steel;
   mixing a binder with the powdered substrate metal to form a mixture, wherein the binder is selected from the group consisting of: thermoplastic resins, waxes, and/or combinations thereof;
   performing an injection molding process using the mixture to form a green substrate in the shape of the vane;
   debinding the green substrate to form a brown substrate in the shape of the vane having an outer surface and a porous structure that extends from the outer surface into the brown substrate, wherein debinding comprises both solvent debinding and thermal debinding;
   applying a surface treatment slurry to at least a portion of the brown substrate including onto the outer surface and into the porous structure including the surface treatment slurry penetrating into the brown substrate a depth of at least about 10 microns, wherein a surface thickness of the surface treatment slurry formed on the brown substrate is from about 10 to about 50 microns above the outer surface, wherein the surface treatment is selected from the group consisting of: aluminide, chromide, and a cobalt-chromium based alloy;
   drying the surface treated brown substrate;
   sintering the dried, surface treated brown substrate to form the vane, wherein sintering is performed at a temperature of about 1000° C. to about 1400° C. for a time period of about 0.5 hours to about 12 hours, and wherein, after sintering the surface treated brown substrate, the vane comprises a soft core and an interdiffusion surface treated layer of up to about 50 microns in thickness; and
   performing a finishing process on the vane.

17. The method of claim 16, wherein the stainless steel is an austenitic stainless steel.

18. The method of claim 16, wherein sintering is performed at a temperature of about 1100° C. to about 1300° C. for a time period of about 2 hours to about 8 hours.

19. The method of claim 16, wherein the finishing process is selected from the group consisting of surface smoothing, machining, riveting, and/or combinations thereof.

20. The method of claim 16, further comprising assembling a turbocharger using the vane.

* * * * *